United States Patent
Vogt

(10) Patent No.: US 11,775,351 B2
(45) Date of Patent: Oct. 3, 2023

(54) METHOD FOR PROCESSING DATA AND PROGRAMMABLE LOGIC CONTROLLER

(71) Applicant: BECKHOFF AUTOMATION GMBH, Verl (DE)

(72) Inventor: Robin Vogt, Verl (DE)

(73) Assignee: Beckhoff Automation GmbH, Verl (DE)

( * ) Notice: Subject to any disclaimer, the term of this patent is extended or adjusted under 35 U.S.C. 154(b) by 315 days.

(21) Appl. No.: 16/209,468

(22) Filed: Dec. 4, 2018

(65) Prior Publication Data

US 2019/0188045 A1     Jun. 20, 2019

(30) Foreign Application Priority Data

Dec. 19, 2017   (DE) .................... 10 2017 130 552.1

(51) Int. Cl.
G06F 9/50      (2006.01)
G06F 9/48      (2006.01)
G06F 9/38      (2018.01)

(52) U.S. Cl.
CPC .......... G06F 9/5066 (2013.01); G06F 9/3877 (2013.01); G06F 9/4831 (2013.01);
(Continued)

(58) Field of Classification Search
None
See application file for complete search history.

(56) References Cited

U.S. PATENT DOCUMENTS 7,207,045 B2   4/2007   Goiffon
9,195,575 B2   11/2015  Kaku et al.
(Continued)

FOREIGN PATENT DOCUMENTS

DE   102012216568 B4   3/2013
DE   102017100655 A1   7/2018
(Continued)

OTHER PUBLICATIONS

Mancuso et al., Optimal Priority Assignment to Control Tasks, Oct. 2014, ACM, ACM Transactions on Embedded Computing Systems, Article No. 161 (Year: 2014).*
(Continued)

*Primary Examiner* — Lewis A Bullock, Jr.
*Assistant Examiner* — Melissa A Headly
(74) *Attorney, Agent, or Firm* — Dorsey & Whitney LLP

(57) ABSTRACT

A method for processing data on a programmable logic controller includes a priority with a predetermined priority level assigned to at least one parallel processing section of a program of a master-processor core of a control task. Respective priority levels are inserted into a data structure as the respective master-processor core arrives at the parallel processing section. A parallel-processor core examines whether entries are present in the data structure and processes partial tasks from a work package of the master-processor core the priority level of which ranks first among the entries. A real-time condition of the control task is met by setting executing times of the programs for the master-processor core so that the master-processor core is capable of processing the partial tasks from the work packages without being supported by the parallel-processor core. The master-processor core further processes partial tasks not processed by the at least one parallel-processor core.

20 Claims, 5 Drawing Sheets

(52) U.S. Cl.
CPC .............. *G06F 9/4887* (2013.01); *G06F 9/50* (2013.01); *G06F 9/5038* (2013.01)

(56) References Cited

U.S. PATENT DOCUMENTS

| | | |
|---|---|---|
| 9,412,158 B2 | 8/2016 | Davis et al. |
| 2014/0165077 A1* | 6/2014 | Martinez Canedo ... G06F 8/456 718/105 |
| 2016/0299796 A1* | 10/2016 | Wang .................... G05B 19/409 |
| 2017/0031327 A1* | 2/2017 | Verma .................. G05B 13/021 |

FOREIGN PATENT DOCUMENTS

| | | |
|---|---|---|
| EP | 2997469 B1 | 3/2016 |
| WO | 2012051972 A2 | 4/2012 |

OTHER PUBLICATIONS

Davis et al., "A Survey of Hard Real-Time Scheduling for Multi-processor Systems," ACM Computing Surveys, Oct. 2011, pp. 35:1-35:43, vol. 43, No. 4, Article 35.

Pyka et al., "Concepts for Parallelizing of Control Tasks and Vision Applications on a Many-Core Platform," Beckhoff Automation GmbH (12 pages).

* cited by examiner

METHOD FOR PROCESSING DATA AND PROGRAMMABLE LOGIC CONTROLLER

CROSS-REFERENCE TO RELATED APPLICATION

This patent application claims priority of German patent application DE 10 2017 130 552.1, filed Dec. 19, 2017, entitled VERFAHREN ZUR DATENVERARBEITUNG UND SPEICHERPROGRAMMIERBARE STEUERUNG, the disclosure and content of which is hereby incorporated by reference, in the entirety and for all purposes.

FIELD

The present invention relates to a method for processing data on a programmable logic controller (PLC). The present invention furthermore relates to a programmable logic controller particularly used for open-loop control or closed-loop control of a machine or of a facility. Moreover the present invention relates to an automation system.

BACKGROUND

Machines or facilities of an automation system are frequently controlled by programmable logic controllers (PLC). The PCL may thereby be provided as an external apparatus or as a software PLC. In order to control the actuators and sensors of the machine or facility, the PCL mostly utilizes a communication interface that may be realized as a field-bus system. The actuators and sensors of the machine or facility may be interlinked via the field-bus system.

By reading out the measuring data of the sensors and/or of the current actual data of the actuators connected to the inputs of the programmable logic controllers, the PLC obtains an information on the status of the machine or facility. The actuators are connected to the outputs of the programmable logic controller and allow for controlling of the machine or facility. In order to dynamically access the actuators, the PLC generates the output data for the actuators on the basis of the actual data and/or on the basis of the measuring data of the sensors, wherein the mentioned data may be individual values or value groups. Accessing the actuators may also be carried out on the basis of parameters, e.g. by movement profiles. In order to be able to provide the desired operational mode of the machine or, respectively, of the facility, the control task of the PLC determines which of the output data generated by the PLC depending on the respective input data are fed to the actuators. Processing of the data by the PLC is usually carried out in a cyclic manner and comprises three steps: providing current input data (e.g. actual data of the actuators and/or measuring data of the sensors), processing the input data to obtain output data, and outputting the output data for movement control (e.g. target positions, etc.).

It is mandatory for controlling the automation system to end the processing of the input data at the point in time at the latest at which the output data are needed for the actuators. This point in time constitutes the deadline and usually corresponds to the end of the program cycle of the PLC. For the programmable logic controller, a solid real-time capability is usually required which means that deadlines have to be consistently met and not be exceeded. In addition, a valid result for the actuators is provided at the time of the deadline. This is particularly relevant if exceeding the deadline may cause body injury or property damage, e.g. if a robot arm is not slowed down in time.

Program execution in the PLC is e.g. determined in the IEC 61131-3 standard. The PLC has a control task which usually consists of one or of a plurality of programs generally to be executed in a cyclic manner, said programs comprising so-called "tasks". In the simplest case, the programmable logic controller only comprises one individual processor core for a plurality of independent programs comprising tasks. For this reason, the available computing time has to be distributed in such a way that all programs having corresponding tasks are able to meet their deadlines. The various cycle times of the programs in the PLC may e.g. and depending on the application be in a range of 100 μs to 20 ms or, in the case of complex tasks, in a range of 50 ms to 100 ms. Due to the various cycle times of the programs it should be avoided that programs comprising tasks with longer cycle times delay the start of programs comprising tasks with shorter cycle times which, as a result, cannot meet their deadlines anymore. Frequently, this can only be achieved if execution of such a slow program is interrupted and continued later. For this reason, each program having corresponding tasks is usually given a predetermined priority level. Said priority level may be determined from the dependencies of the respective programs on the other programs, if the programs e.g. rely on the results of the other programs.

Since most PLC processors comprise a plurality of processor cores and/or a plurality of processors, the PLC may distribute programs having corresponding tasks to a plurality of processor cores or processors in order to reduce the total processing time of the programs having corresponding tasks. DE 10 2012 216 568 B4 discloses a method for executing programs with corresponding tasks on a plurality of processor cores, wherein the programs are organized in program groups and the respective program group may be assigned a priority level. Within a program group, the priority level of the programs is the same, i.e. individual priority levels for the individual programs are not taken into account. The programs may be interrupted in favor of other programs having a higher priority level on the processor cores operating in parallel and later be continued on the processor cores operating in parallel.

SUMMARY

The present invention provides an improved method for processing data that may be used in a real-time system and an improved programmable logic controller that can execute the method. Furthermore the present invention provides an improved automation system.

EXAMPLES

According to one aspect, a method for processing data on a programmable logic controller is proposed. A priority with a predetermined priority level is assigned to at least one parallel processing section of a program of a master-processor core of a control task. The respective priority levels are inserted into a data structure as soon as the respective master-processor core has arrived at the parallel processing section in the program. At least one parallel-processor core examines whether entries are present in the data structure and, if entries are present, processes partial tasks from a work package of the master-processor core, the priority level of which ranks first among the entries in the data structure. A real-time condition of the control task is met by setting executing times of the programs for the respective master-processor cores in such a way that the plurality of master-processor cores is capable of processing the partial tasks from the work packages without being supported by the at least one parallel-processor core. The plurality of master-processor cores further processes partial tasks that are not processed by the at least one parallel-processor core.

According to another aspect a programmable logic controller (PLC) comprises a communications interface for reading in sensor data and for outputting actuator data. The PLC further comprises a data-processing unit, comprising a plurality of master-processor cores and at least one parallel-processor core for carrying out a control task in order to generate actuator data from the sensor data. Besides the PLC comprises a control unit, comprising a memory for storing a data structure, comprising priority levels and a priorities administrator for administrating the priority levels in the data structure. The master-processor cores are each assigned an executable program of the control task. Each program comprises at least one parallel processing section having a work package, and the work package comprises a plurality of partial tasks.

The parallel processing sections in the respective programs are assigned the predetermined priority level. The priorities administrator is configured to insert the respective priority levels into the data structure in the memory as soon as the respective master-processor core has reached the parallel processing section in the program, thereby setting the entry having the highest priority level in the first place of the entries in the data structure. The at least one parallel-processor core is configured to examine the data structure in the memory for entries of the priority levels, and if entries are present, to process partial tasks from the work package of the master-processor core, the priority level of which ranks first among the entries in the data structure. The programmable logic controller is configured to meet a real-time condition of the control task by determining executing times of the programs for the respective master-processor cores in such a way that the plurality of master-processor cores is capable of processing the partial tasks from the work packages without being supported by the at least one parallel-processor core. The plurality of master-processor cores is configured to process partial tasks that cannot be processed by the at least one parallel-processor core.

According to another aspect an automation system comprises a programmable logic controller (PLC), comprising a communications interface for reading in sensor data and for outputting actuator data. The automation system further comprises a data-processing unit comprising a plurality of master-processor cores and at least one parallel-processor core for carrying out a control task in order to generate actuator data from the sensor data. Besides the automation system comprises a control unit comprising a memory for storing a data structure comprising priority levels and a priorities administrator for administrating the priority levels in the data structure. The automation system furthermore comprises a machine or a system, comprising actuators and sensors. The actuators and sensors of the machine are connected to the programmable logic controller via the communications interface.

BRIEF DESCRIPTION OF THE DRAWINGS

The above-described properties, features and advantages of the present invention as well as the manner in which these are achieved will become clearer in context with the following description of exemplary embodiments shown in more detail in conjunction with the schematic drawings, in which.

DETAILED DESCRIPTION

Figure 1:
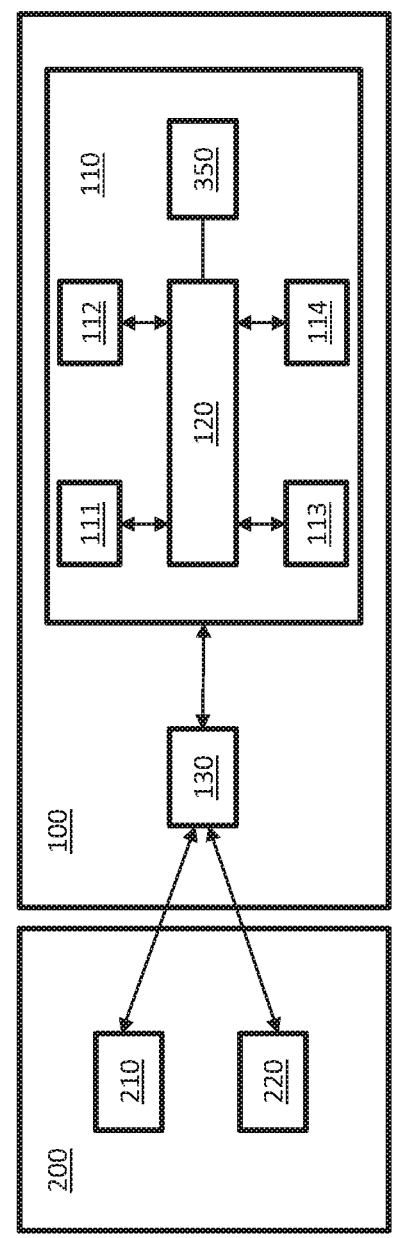
FIG. 1 shows a schematic view of an automation system with a programmable logic controller (PLC).

An exemplary embodiment of a method for processing data on a programmable logic controller (PLC) is described in the following figures. It is to be noted that the figures are only schematic and not to scale. For this reason, components and elements shown in the figures may be depicted excessively large or smaller in order to ensure better understanding. It is furthermore to be noted that the reference numerals in the figures were maintained if referring to identically configured elements and/or components and/or dimensions.

A method for processing data on a programmable logic controller (PLC) is proposed. The PLC comprises a plurality of master-processor cores and at least one parallel-processor core wherein the master-processor cores are each assigned an executable program of a control task. Each program comprises at least one parallel processing section having a work package comprising a plurality of partial tasks. The parallel processing sections in the respective programs are given a priority with a predetermined priority level. The respective priority levels are inserted into a data structure as soon as the respective master-processor core in the program has arrived at a parallel processing section. The at least one parallel-processor core examines whether entries are present in the data structure. Provided that entries are present in the data structure, the at least one parallel-processor core processes partial tasks from the work package of the master-processor core the priority level of which ranks first among the entries in the data structure. A real-time condition of the control task is met by determining the execution times of the programs for the respective master-processor cores in such a way that the plurality of master-processor cores is capable of processing the partial tasks from the work packages without being supported by the at least one parallel-processor core. The plurality of master-processor cores further processes partial tasks that are not processed by the at least one parallel-processor core.

By distributing the individual tasks of the respective programs of the master-processor cores to the plurality of master-processor cores and the at least one parallel-processor core, the total processing time of the tasks and the execution time of the respective programs may be reduced. The tasks as such may be subdivided into work packages having independent partial tasks in order to reduce the execution times, and be processed in the parallel processing section of the executable program of the control task on the corresponding master-processor core and the at least one parallel-processor core. Hence it is e.g. possible to use the free calculating capacity for larger or more complex tasks in order to be able to keep the deadlines. The plurality of master-processor cores may each only process the partial tasks of their own work packages and not the partial tasks of programs on the other master-processor cores, whereas the at least one parallel-processor core may process the partial tasks of all master-processor cores. Hence, such an embodiment has the advantage that the existing resources are used in an optimal manner since the plurality of master-processor cores and the at least one parallel-processor core jointly participate in the processing of the partial tasks.

Distribution of the partial tasks of the respective programs of the master-processor cores to the plurality of master-processor cores and the at least one parallel-processor core may continually confer real-time capability to the PLC's data processing as due to the distribution of tasks, the deadlines of the respective programs may be met in an ideal manner. It is advantageous that parallelizing enables the most highly prioritized programs of the plurality of master-processor cores to schedule the shorter execution time of the programs, and in this manner to keep a deadline that is shorter than a purely sequential execution time of the programs. Thus, e.g. a machine or facility of an automation system may operate faster.

In another embodiment, the partial tasks are distributed dynamically. The master-processor cores and the at least one parallel-processor core access unprocessed partial tasks in the work packages for processing, while the partial tasks assigned to the at least one parallel-processor core for processing may also be carried out on the corresponding master-processor core. Compared to static distribution, dynamic distribution of the partial tasks offers the possibility of more effectively using the available computing capacity as the master-processor cores and the at least one parallel-processor core may themselves actively request free partial tasks from the work package and obtain access to unprocessed partial tasks from the work package. If a partial task has been completely processed by the assigned master-processor core and if the at least one parallel-processor core is e.g. occupied by another partial task, the corresponding master-processor core is able (and supposed) to request a new, unprocessed partial task from the work package and process it, notwithstanding what the at least one parallel-processor core is processing. In this manner, the unused computing capacity may be used for timely processing of the partial tasks in order to reduce the total processing time of the respective program of the control task and to keep the deadlines.

In another embodiment, only the master-processor core currently processing the corresponding partial task or the at least one parallel-processor core currently processing the corresponding partial task have access to the corresponding partial task from one of the work packages. The partial tasks from the work packages are distributed to the master-processor cores and the at least one parallel-processor core individually or one after the other. If only the master-processor core currently processing the corresponding partial task or the at least one parallel-processor core currently processing the corresponding partial task have access to the corresponding partial task, unnecessary multiple processing of the same partial task may be avoided. In addition, multiple distribution of the partial task is eliminated by carrying out distribution of partial tasks individually and one after the other.

In another embodiment, distribution of the partial tasks from the respective work packages is carried out statically. For this purpose, the master-processor cores and the at least one parallel-processor core are each assigned a specific number of partial tasks from the same work package for parallel processing. In this embodiment, the additional computing time for requesting the partial tasks from the work packages is eliminated for the at least one parallel processing core. By the respective static distribution that may e.g. be carried out at the start of program execution or at the beginning of the parallel processing section of the program, it is also possible to reduce the time and effort involved in administration.

In a further embodiment, the at least one parallel-processor core is informed about changes in the order of entries of the priority levels in the data structure. In the active embodiment, the at least one parallel-processor core is informed about changes in the order of the entries of the priority levels at first place in the data structure so that the partial task currently being processed is interrupted and after successfully requesting a new partial task from the work package of the master-processor core having a higher priority level, the processing of said partial task may be started. A conceivable alternative to this is a passive embodiment in which the at least one parallel-processor core itself requests if the order of the entries of the priority levels in the first place of the entries in the data structure has changed. The at least one parallel-processor core may, if required, interrupt the calculations, i.e. processing of the current partial task.

In another embodiment, the calculations of current partial tasks in the parallel processing section on the at least one parallel-processor core are interrupted if a new entry of a priority level is set to first place in the data structure. By interrupting the calculations of current partial tasks on the at least one parallel-processor core, the deadlines of the programs may be kept and real-time processing may be allowed for. Moreover, such an embodiment allows for better utilization of the computing capacity as it is e.g. possible to further calculate the partial task interrupted by the at least one parallel-processor core on the corresponding master-processor core starting from the interruption point, while the at least one parallel-processor core starts to process the new partial task. As an alternative thereto, the interrupted partial task may be further processed on the at least one parallel-processor core even after finishing the partial tasks from the work package of the parallel processing section having a higher priority level.

In another embodiment, the current partial tasks are processed further by the at least one parallel-processor core up until a predetermined interruption point and then interrupted. Such an embodiment has the advantage that less data have to be saved as it is known which data are needed for continuing the interrupted partial task. Moreover, implementing the embodiment requires less interference into the system than may e.g. be required in case of an immediate interruption of the partial task on the at least one parallel-processor core and the subsequent continuing on the respective master-processor core.

In another embodiment, the interruption point is particularly determined in a control structure within the partial tasks of the work packages in the corresponding programs of the master-processor cores. The interruption point may e.g. be set at the start or at the end of a control-structure cycle. The control structure may be realized as a loop as specific instructions of the corresponding programs of the master-processor cores may iteratively be carried out several times with varying variables. Consequently, setting the interruption point in the control structure in the partial tasks of the work packages makes data protection easy and concise as e.g. only the current iteration and, as the case may be, the existing intermediate results of the calculations have to be saved.

In another embodiment, an intermediate result of the calculations of the current partial tasks of the work packages is saved. If the intermediate result of the calculations of the partial tasks is saved, interrupted partial tasks do not have to be completely re-calculated on the respective master-processor core or the at least one parallel-processor core as the original intermediate result is not lost. Usually, however, it cannot be determined which data are relevant for continuing the partial task from the corresponding work package of the assigned master-processor core after the interruption, as the partial task is interrupted at any desired point of the program of the master-processor core during the execution time of the program. In so far, this embodiment may require to save all data generated or, respectively, processed during the calculation of the partial task in the respective program of the assigned master-processor core if no corresponding interruption point was set in the partial tasks, as by the predetermined interruption point which may e.g. be set in the control structure in the partial task it is known which data are required for continuing the interrupted partial task. In case of the set interruption point, not all data have to be saved; it is sufficient to save the current iteration of the control structure, that may be a loop, and, if the case may be, existing intermediate results of the calculation.

Another embodiment provides that the calculations of the partial tasks on the at least one parallel-processor core are immediately interrupted without saving any intermediate results of the calculations. As a result, an interrupted partial task has to be completely re-calculated. The advantage thereby is that by this embodiment, a lowest possible latency may be achieved, the term "latency" referring to the time between the interruption of the calculations of the current partial task on the at least one parallel-processor core and the start of the calculations of the other partial task linked to a higher priority level on the at least one parallel-processor core.

A programmable logic controller (PLC) is furthermore proposed. The PLC comprises a communication interface for reading in sensor data and for outputting actuator data. Further components of the PLC are a data-processing unit comprising a plurality of master-processor cores and at least one parallel-processor core for carrying out a control task in order to generate actuator data from the sensor data, and a control unit comprising a memory for saving a data structure having priority levels and a priorities administrator for administrating the priority levels within the data structure.

The master-processor cores are each assigned an executable program of the control task, wherein each program comprises a parallel processing section having a work package, the work package comprising a plurality of partial tasks. The parallel processing sections in the respective programs are assigned the predetermined priority level. The priorities administrator is configured to insert the respective priority levels into the data structure in the memory as soon as the respective master processor core in the program has arrived at the parallel processing section, thereby setting the entry having the highest priority level to first place in the data structure in the memory. The at least one parallel-processor core is configured to examine the data structure in the memory for entries of the priority levels. The at least one parallel-processor core is, provided that entries are present in the data structure, furthermore configured to process the partial tasks from the work package of the master-processor core, the priority level of which is in first place of the entries in the data structure. The programmable logic controller is furthermore configured to meet a real-time condition of the control task by determining execution times of the programs for the respective master-processor cores in such a way that the plurality of master-processor cores are capable of processing the partial tasks from the work packages without being supported by the at least one parallel-processor core. Furthermore, the plurality of master-processor cores is configured to process partial tasks that are not processed by the at least one parallel-processor core.

Programmable logic controllers frequently form the basis of an automation system and currently have complex computing and controlling functionalities requiring powerful hardware and efficient software for implementation. The high computing power may thereby be based on simultaneous utilization of a plurality of master-processor cores and the at least one parallel-processor core in order to operate the system efficiently and to use the present resources to full capacity in the best possible manner. The thus designed PLC allows for keeping the program deadlines and may further safeguard real-time data processing.

In another embodiment, the control unit is realized on a plurality of master-processor cores in a distributed manner. This embodiment allows for using the computing capacity flexibly while continuing to grant other applications access to the master-processor cores.

The priorities administrator as a constituent of the control unit may e.g. comprise a plurality of modules, wherein the individual modules of the priorities administrator may be carried out on a plurality of master-processor cores. It is furthermore conceivable that the priorities administrator only comprises one single central module which is executed on one of the plurality of master-processor cores.

In a further embodiment, the priorities administrator is configured to replace the first entry of the priority level of the plurality of master-processor cores of the data structure by a new entry, provided that this entry has a higher priority level. The priorities administrator is further configured to inform the at least one parallel-processor core on any change of the entries of the data structure in order to interrupt current calculations of partial tasks from the corresponding work package. In this way, the priorities administrators provides simple coordination of the entries of the priority levels in the data structure and simple communication with the at least one parallel-processor core.

A further embodiment provides that the at least one parallel-processor core is configured to interrupt the calculations of the current partial tasks from the corresponding work package when a new entry of a priority level is set to first place among the entries in the data structure in the memory and to hand over the intermediate results of the calculations to the control unit. The control unit is configured to save the intermediate results of the calculations of the current partial tasks from the respective work packages on a control unit which is accessed by the plurality of master-processor cores and the at least one parallel-processor core. The control unit provides a clearly configured saving of the intermediate results of the calculations as the data are saved centrally on the memory unit which may be accessed by the master-processor core and by the at least one parallel-processor core.

In a further embodiment, the priorities administrator is configured to remove the entries of the priority levels of the plurality of master-processor cores from the data structure if the partial tasks from the corresponding work packages have been fully processed. In such a configuration of the priorities administrator, the memory of the control unit may be updated in a simple manner.

Programmable logic controllers (PLC) are often the basis of an automation system and serve to control a facility or a machine in open and closed loops. In this context, the PLC or, respectively, the facility or machine is accessed via sensors and actuators. The sensors and actuators may be linked with the machine or the facility via a communications interface wherein the PLC uses the communications interface in order to interact with the sensors and actuators. Data processing by the PLC is usually carried out in a cyclic manner and requires the PLC, or rather the control task, to consistently meet deadlines. In this context, it must not occur that at the point in time when the output data for the actuators are required the processing of the input data is not yet finished. Hence, the control task has to be able to safeguard the real-time capability of the automation system.

In general, the control task of the PLC consists of one or a plurality of cyclically executable programs having tasks. As most PLC processors comprise a plurality of processor cores that may e.g. be realized as master-processor and parallel-processor cores and/or comprise a plurality of processors, the PLC may distribute the programs with their tasks to a plurality of processor cores and/or to a plurality of processors in order to reduce the total processing time of the programs comprising tasks and to safeguard that the deadlines of the programs are met. If the program tasks are processed in parallel by a plurality of processor cores (master-processor cores and parallel-processor cores), it makes sense to be able to correspondingly classify the tasks of the programs for processing in accordance with a predetermined priority level. For this reason, each program having corresponding tasks is usually assigned a predetermined priority level. Said priority level may be determined from the dependencies of the respective programs with regard to the other programs, if the programs e.g. rely on the results of the other programs.

The priority level of the corresponding program having tasks is organized by a priorities administrator in a data structure. The priorities administrator enters the priority level into the data structure. Provided that no other entry of a priority level is present in the data structure, the priorities administrator will put the priority level to first place in the data structure. The priorities administrator may further be configured to inform the processor cores operating in parallel as soon as the order of the entries of the priority levels in the data structure changes. For example, the order may change when a new entry of a priority level is added to the data structure, wherein this priority level may then have a higher value than the priority level of the earlier entry. In such a case, the parallel processor cores may interrupt the current tasks of the corresponding program and start on processing the tasks that correspond to the higher priority level of the respective program in order to meet its deadline. The tasks of the corresponding programs may be subdivided into a plurality of work packages comprising partial tasks.

On the master-processor cores, the respective program of the control task of the PLC is carried out, wherein the execution times of the programs are determined in such a way that the master-processor cores may process the partial tasks without being supported by the parallel-processor cores. In order to reduce the execution times of the programs, however, the parallel-processor cores may cooperate in the processing of the partial tasks, as well. The possibility of processing the partial tasks in parallel by the master-processor cores and the parallel-processor cores in order to meet the deadlines of the respective programs of the master-processor cores and to be able to guarantee the real-time capability of the automation system is a basic idea. Moreover, an ideal utilization of the resources may be provided by the master-processor cores and the parallel-processor cores jointly processing partial tasks.

FIG. 1 shows a programmable logic controller (PLC) 100 for controlling a machine or, respectively, a facility 200. The PLC 100 comprises a communications interface 130 as well as a data-processing unit 110. Via the communications interface 130 that may e.g. be realized as a hardware-type and/or software-type field-bus master of a field-bus system, the PLC 100 may control the corresponding actuators 210 and sensors 220 of the machine or, respectively, of the facility 200 of the automation system, wherein the actuators 210 and sensors 220 may be interlinked by the field-bus system.

In order to be able to provide the desired operational mode of the machine or, respectively, of the facility 200, the control task of the PLC determines which output data generated by the PLC 100 depending on the corresponding input data are fed to the actuators 210. The PLC 100 obtains an information on the state of the machine or, respectively, of the facility 200 by reading out the measuring data of the sensors 220 and/or the actual data of the actuators 210 which are correspondingly connected to the inputs of the PLC 100. The sensors 220 may generate an electrical signal for detecting a measuring value or record the measuring value themselves in an analogue or digital manner. The actuators 210 are connected to the outputs of the PLC 100 and transfer the electrical signals of the output data of the PLC 100 into mechanical movement or into other physical values (e.g. temperature, pressure etc.).

The dynamic accessing of the actuators 210 may at first be based on reading out the current actual data of the actuators 210. On the basis of the actual data of the actuators and the measuring data of the sensors 220, the output data of the actuators may be generated from the input data. As an alternative thereto, accessing the actuators 210 may be done on the basis of parameters, e.g. by movement profiles.

The data-processing unit 110 comprises a plurality of processor cores, wherein FIG. 1 e.g. shows a first master-processor core 111 and a second master-processor core 112 as well as a first parallel-processor core 113 and a second parallel-processor core 114. Also conceivable is an embodiment in which the data-processing unit 110 comprises a number of master-processor cores and/or parallel-processor cores differing from the aforementioned number. The advantage of an embodiment of the data-processing unit 110 having a first master-processor core 111 and a second master-processor core 112 as well as a first parallel-processor core 113 and a second parallel-processor core 114 is that the partial tasks of the respective programs of the control task of the PLC 100 that are to be executed may be distributed to the two master-processor cores 111, 112 and the two parallel-processor cores 113, 114 according to the following description. Thereby, it is possible to reduce the computing time and, in addition, to safeguard an optimal utilization of the resources.

The first master-processor core 111 and the second master-processor core 112 are each assigned the executable program of the control task, wherein the first parallel-processor core 113 and the second parallel-processor core 114 may, as mentioned above, participate in the processing of the partial tasks in the corresponding programs of the first and the second master-processor core 111, 112 in a supporting manner. The control task may e.g. consist of a program cycle executed within the PLC 100 wherein the program cycle comprises receiving the input data (the measuring data of the sensors 220 and the current actual data of the actuators 210), processing the input data to obtain output data for the actuators 210 and the outputting of the output data for the actuators 210. After successful processing, i.e. at the end of the program cycle, the program cycle of the control task starts again.

Contrary to the inventive program cycle of the control task, a field-bus cycle, apart from the above-mentioned steps of the program cycle, furthermore comprises transferring the input data of the sensors 220 or, respectively, actuators 210 to the PLC 100 via the field bus. The output data generated in the program cycle within the PLC 100 are furthermore transferred in the field-bus cycle to the actuators 210 via the field bus so that the actuators 210 may act in accordance with the received output data.

If the partial tasks are processed by a master-processor core and a plurality of parallel-processor cores in parallel, the partial tasks may be assigned to a parallel processing section in the program of the first master-processor core 111 or, respectively, in the program of the second master-processor core 112. The parallel processing sections in the corresponding programs of the first master-processor core 111 and of the second master-processor core 112 may be assigned a priority with a predetermined first priority level and a predetermined second priority level, wherein the first priority level and the second priority level are organized by a priorities administrator 350 of a control unit 120. The priorities administrator 350 primarily serves to administrate the first and the second priority level in the data structure. Furthermore, the priorities administrator 350 may be configured to inform the first and the second parallel-processor core 113, 114 on a change in the order of the entries of the priority levels in the data structure.

The priorities administrator 350 may be executed on the first master-processor core 111 and/or the second master-processor core 112. It is also conceivable to realize the priorities administrator 350 as a stand-alone module which the first parallel-processor core 113 and the second parallel-processor core 114 may access in order to support the first master-processor core 111 and the second master-processor core 112 in processing the partial tasks.

In the parallel processing sections in the programs of the first master-processor core 111 and the second master-processor core 112, a first work package and a second work package are additionally generated. The first work package comprises a first portion of partial tasks and the second work package comprises a second portion of partial tasks. The first portion of partial tasks and the second portion of partial tasks may be processed by the first master-processor core 111 and the second master-processor core 112 or, respectively, by the first parallel-processor core 113 and the second parallel-processor core 114 in accordance with the first and second priority level of the associated parallel processing section.

It is furthermore conceivable that a plurality of programs of the control task may be executed on one single master-processor core 111, 112. The partial tasks from the corresponding work packages of the respective programs are processed on the one master-processor core 111, 112 according to a sequential priority level. The sequential priority level of the programs may differ from the priority level of the parallel processing sections assigned to the respective programs. For example, it is thus possible that partial tasks of a work package of a corresponding program are executed on the parallel processor cores 113, 114 and at the same time, partial tasks from said work package may be processed sequentially by the one master-processor core 111, 112. In case the sequential processing of the partial tasks of the corresponding work package is interrupted by a more highly prioritized program on the one master-processor core 111, 112, the partial tasks of the corresponding work packages may still be processed further and in parallel by the parallel-processor cores 113, 114 as the parallel processing sections in the corresponding programs may in the corresponding programs be assigned a priority level separate with regard to the sequential priority level. As a result, a displacement of the current partial tasks by more highly prioritized other partial tasks may take place not only in case of parallel processing of the partial tasks on the parallel-processor cores 113, 114, but also in case of sequential processing of the partial tasks on the one master-processor core 111, 112.

Figure 2:
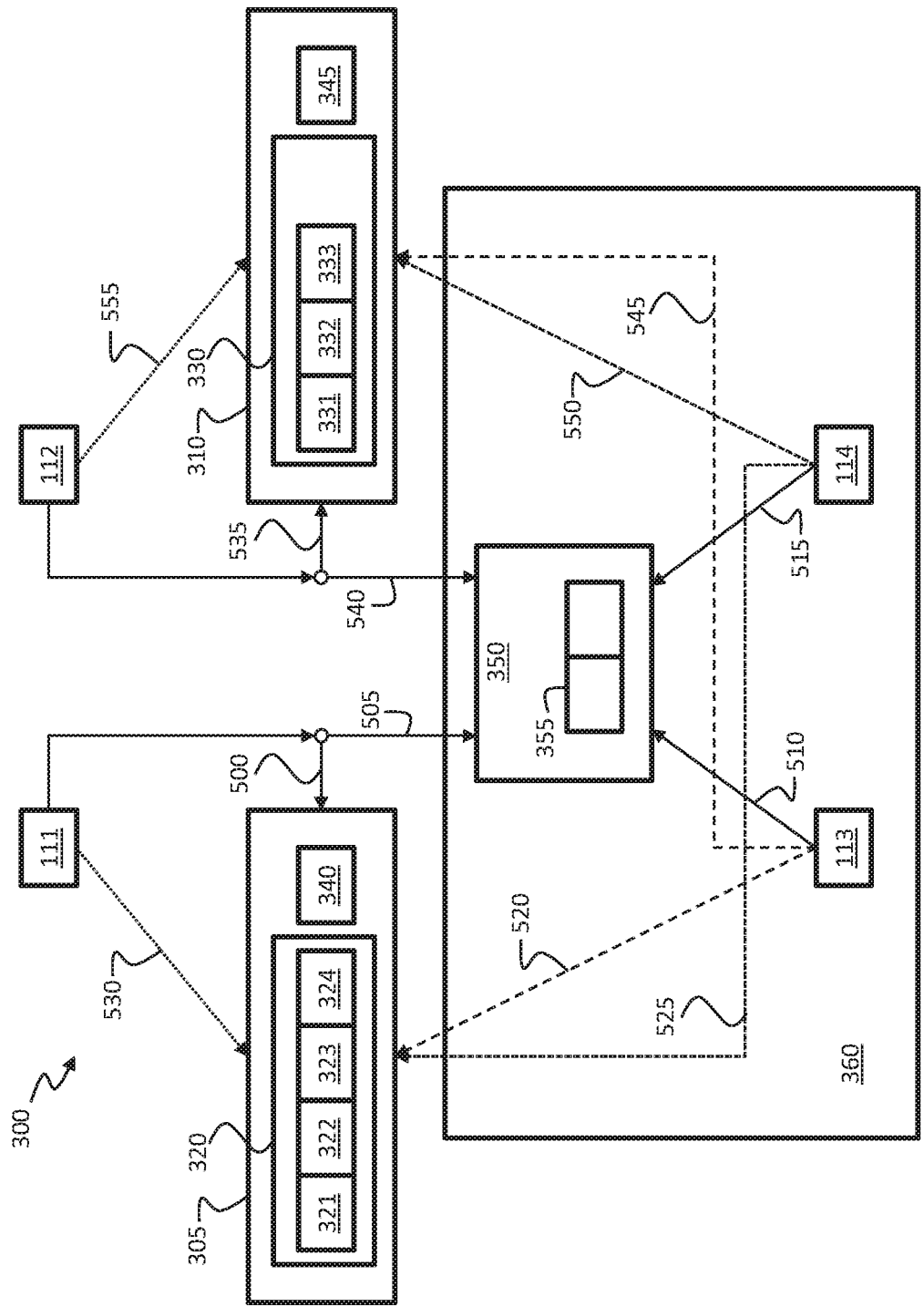
FIG. 2 shows a diagram of a method for processing data on the PLC of FIG. 1.

FIG. 2 shows a schematic structure of a method 300 for processing data on the PLC by the embodiment of FIG. 1. The programs of the control tasks to be executed by the first master-processor core 111 and the second master-processor core 112 each comprise the parallel processing section. The arrow having reference numeral 500 indicates generating the first work package 305 at the beginning of the parallel processing section of the first master-processor core 111. The first work package 305 comprises the first portion of partial tasks 320 that in the shown example consist of a first partial task 321, a second partial task 322, a third partial task 323 and a fourth partial task 324. The first work package 305 further comprises the reference to the first priority level 340 of the parallel processing section of the first master-processor core 111. Handing over the reference to the first priority level 340 of the parallel processing section of the first master-processor core 111 to the priorities administrator 350 is shown by the arrow having reference numeral 505. The priorities administrator 350 inserts the first priority level 340 into a data structure 355 and saves the data structure 355 in the memory of the control unit, which in the following is referred to as data-structure memory. If the data structure 355 has no entries, the priorities administrator 350 inserts the reference to the first priority level 340 at first place among the entries of the priority levels in the data structure 355.

The arrows having reference numerals 510, 515 show the request of the first and the second parallel-processor core 113, 114 to the priorities administrator 350 which entry of the priority levels ranks first among the entries in the data structure 355. For example, the first entry of the priority level in the data structure 355 may be the reference to the first priority level 340 of the first master-processor core 111. As the first priority level 340 refers to the parallel processing section of the first master-processor core 111, the first parallel-processor core 113 and the second parallel-processor core 114 access the corresponding first work package 305. The access of the first and second parallel-processor core 113, 114 to the first work package 305 is indicated by the arrows having reference numerals 520, 525. The first parallel-processor core 113 may e.g. send a request to the first work package 350 whether a free first to fourth partial task 321-324 exists that has not been distributed differently. The request of the first parallel-processor core is shown by the arrow having reference numeral 520. This may e.g. be the first partial task 321 which the first parallel-processor core 113 is assigned for processing. The first partial task 321 is then no longer available for distribution in order to be able to avoid multiple distribution of the same partial task. In this manner, the second parallel-processor core 113 may e.g. be assigned the second partial task 322. The first master-processor core 111 may also sequentially process partial tasks during the parallel processing section in the program; as a result, it also demands a free first to fourth partial task 321-324 for processing from the first work package 305. The request of the first master-processor core 111 is indicated by the arrow having reference numeral 530. It may, for example, be assigned the third partial task 323.

As soon as the first master-processor core 111 or one of the two parallel-processor cores 113, 114 have fully processed their first to third partial task 321-323, the remaining fourth partial task 324 may be distributed as described above. An embodiment example was given for the distribution of the first to fourth partial task 321-324 to the first master-processor core 111 and the first and second parallel-processor core 113, 114. It is also conceivable to divide up the first to fourth partial task 321-324 differently between the first master-processor core 111 and the first and second parallel-processor core 113, 114.

If the second master-processor core 112 arrives at its parallel processing section in its program, it will generate the second work package 310 comprising the second portion of partial tasks 330 which in the shown example consists of a fifth partial task 331, a sixth partial task 332 and a seventh partial task 333. Generating the second work package 310 by the second master-processor core 112 is visualized by the arrow having reference numeral 535. Moreover, the second work package 310 comprises the reference to the second priority level 345 of the parallel processing section in the program of the second master-processor core 112. The reference to the second priority level 345 is handed over to the priorities administrator 350 by the second master-processor core 112; this process is shown by the arrow having reference numeral 540. Depending on its value, the priorities administrator 350 ranks the reference to the second priority level 345 in second place of the entries of the priority levels in the data structure 355 or in first place of the entries of the priority levels in the data structure 355. In case another entry was in first place among the entries of the priority levels in the data structure 355, said entry will, in case that the first priority level 340 is lower than the second priority level 345 of the new entry, ranked in second place of the entries of the priority levels in the data structure 355 by the priorities administrator 350 and the entries of the data structure 355 will be saved in the data-structure memory.

If the order of the entries of the priority levels in the data structure 355 changes, the priorities administrator 350 informs the first and second parallel-processor core 113, 114 accordingly. This process involves interrupting the first, second and, as the case may be, fourth partial task 321, 322, 324 from the first portion of partial tasks 320 currently processed by the first parallel-processor core 113 and/or the second parallel-processor core 114. The intermediate results of the calculations may be handed over to the control unit 120 shown in FIG. 1 and saved on a memory unit and in the following referred to as intermediate-result-memory unit. The intermediate-result-memory unit may be accessed by the first and second master-processor core 111, 112 as well as by the first and second parallel-processor core 113, 114, if processing of the interrupted first, second and, as the case may be, fourth partial task 321, 322, 324 is to be continued on the parallel-processor cores 113, 114.

While the first master-processor core 111 continues to sequentially process the third partial task 323 from the first portion of partial tasks 320 of the first work package 305, the first parallel-processor core 113 and the second parallel-processor core 114 as well as the second master-processor core 112 demand the fifth to seventh partial tasks 331-333 from the second portion of partial tasks 303 from the second work package 310. The requests of the respective processor cores are indicated by three arrows having numerals 545, 550, 555. For example, the fifth partial task 331 may be assigned to the first parallel processor core 113 and the seventh partial task 333 to the second parallel-processor core 114. The sixth partial task 332 may in the meantime be sequentially processed by the second master-processor core 112. For distributing the fifth to seventh partial task 331-333 to the first and second parallel-processor core 113, 114 and the second master-processor core 112, it is conceivable to divide up the fifth to seventh partial task 331-333 in a manner differing from the shown example.

If the fifth, sixth and seventh partial task 331, 332, 333 from the second portion of partial tasks 330 is completely finished by the above-described processor cores, the corresponding second work package 310 informs the priorities administrator 350 accordingly so that the priorities administrator 350 removes the corresponding reference to the second priority level 345 from the entries of priority levels in the data structure 355. After the fifth and/or sixth and/or seventh partial task 331, 332, 333 have been completely processed by the two parallel-processor cores 113, 114 and the second master-processor core 112, processing of the interrupted first and/or second partial tasks 321, 322 on the two parallel-processor cores 113, 114 may be continued. The distribution of the first and second partial task 321, 322 on the first and second parallel-processor core 113, 114 may in this context e.g. be carried out in analogy to the described embodiment example, i.e. the first parallel-processor core 113 is assigned the first partial task 321 and the second parallel-processor core 114 is assigned the partial task 322 of the first work package. The two parallel-processor cores 113, 114 access the intermediate-result-memory unit in order to be able to use the intermediate results of the first and second partial task 321, 322 to further process the mentioned partial tasks.

As the first master-processor core 111 has further processed the third partial task 323 of the first work package 305 while the first parallel-processor core 113 has processed the fifth partial task 331 and the second parallel-processor core 114 has processed the seventh partial task 333 from the second work package 310, it is possible that the first master-processor core 111 fully finishes processing of the third partial task 323 in the time in which the parallel-processor cores 113, 114 fully process their assigned fifth and seventh partial tasks 331, 333. After this, the first master-processor core 111 may send a request to the first work package 304 for the remaining fourth partial task 324 and process it while the parallel-processor cores 113, 114 continue to process the first and second partial task 321, 322. The request sent by the first master-processor core 111 to the first work package 305 is indicated by the arrow having reference numeral 520.

If the first, second and fourth partial task 321, 322, 324 have been fully processed by the first and second parallel-processor core 113, 114, as well as by the first master-processor core 111 (and the third partial task 323 has been finished by the first master-processor core 111), the associated first work package 305 informs the priorities administrator 350 that the first, second and fourth partial task 321, 322, 324 (and the third partial task 323) have been finished so that the priorities administrator 350 removes the reference to the first priority level 340 from the entries of the priority levels in the data structure 355. It is furthermore conceivable that the priorities administrator 350 sends a request to the first and second work package 305, 310 whether first to seventh partial tasks 321-324, 331-333 from the first and second portion of partial tasks 320, 330 still remain for processing and then, if the case may be, removes the corresponding reference to the first and second priority level 340, 345 from the data structure in the data-structure memory.

By distributing individual first to seventh partial tasks 321-324, 331-333 to the first and second master-processor core 111, 112 and the first and second parallel-processor core 113, 114, the total computing time of the first to seventh partial tasks 321-324, 331-333 may be reduced and the computing capacity may be utilized in an ideal manner. Moreover, deadlines of the programs may be kept and the real-time capacity of the control task may be safeguarded by taking the first and second priority level 340, 345 of the respective parallel processing sections of the programs of the first and second master-processor core 111, 112 into account, since by the first and second priority level 340, 345 processing the first to fourth partial task 321-324 from the first portion of partial tasks 320 may be interrupted in favor of other fifth to seventh partial tasks 331-332 from the second portion of partial tasks 330 if these are assigned a higher second priority level. It is also conceivable that processing the fifth to seventh partial task 331-333 from the second portion of partial tasks having the second priority level is interrupted due to the more highly prioritized first portion of partial tasks 320 with the first to fourth partial task 321-324 and the first priority level. Interrupted first to seventh partial tasks 321-324, 331-333 from the first and second portion of partial tasks 320, 333 may be further processed as the reference to the first and second priority-level entry 340, 345 is maintained in the data structure 355 in the data-structure memory as long as the corresponding first to seventh partial tasks 321-324, 331-333 from the first and second portion of partial tasks 320, 330 of the first and second work package 305, 310 have not been fully processed.

In an embodiment, the priorities administrator 350 may actively inform the first and second parallel-processor core 113, 114 on the change of the first entry of the first or second priority level 340, 345 in the data structure 355. As a result, the first and second parallel-processor core 113, 114 may each directly send a request to the corresponding first or second work package 305, 310 for a free first to seventh partial task 321-324, 331-333 and start on their processing in a timely fashion. The requests of the respective processor cores are indicated by reference numerals 520, 525, 545, 550. Moreover, the priorities administrator 350 may be configured in such a way that the first and second parallel-processor core 113, 114 themselves actively inquire with the priorities administrator 350 whether any changes have occurred in the order of the entries of the first and second priority level 340, 345. The inquiry of the first and second parallel-processor core 113, 114 is indicated by the two arrows having reference numerals 510, 515.

It is furthermore conceivable that the requests of the first and second master-processor core 111, 112 and the first and second parallel-processor core 113, 114 to the first or second work package 305, 310 are controlled by a central unit. The requests of the respective processor cores are indicated by the arrows with reference signs 520, 525, 530, 545, 550, 555. The central unit may further control task distribution of the first to seventh partial tasks 321-324, 331-333 from the first and second portion of partial tasks 320, 333 of the first and second work package 305, 310. Furthermore, the central unit may provide that the information on having finalized all first to seventh partial tasks 321-324, 331-333 from the first and second portion of partial tasks 320, 333 of the first and second work package 305, 310 is forwarded to the priorities administrator 350.

If the first and second priority level 340, 345 of the corresponding parallel processing sections in the programs of the first and second master-processor cores 111, 112 have the same value, the first and second master-processor core 111, 112 may share the first and second parallel-processor core 113, 114 for parallelized execution 360 of the first to seventh partial tasks 321-324, 331-333.

Figure 3:
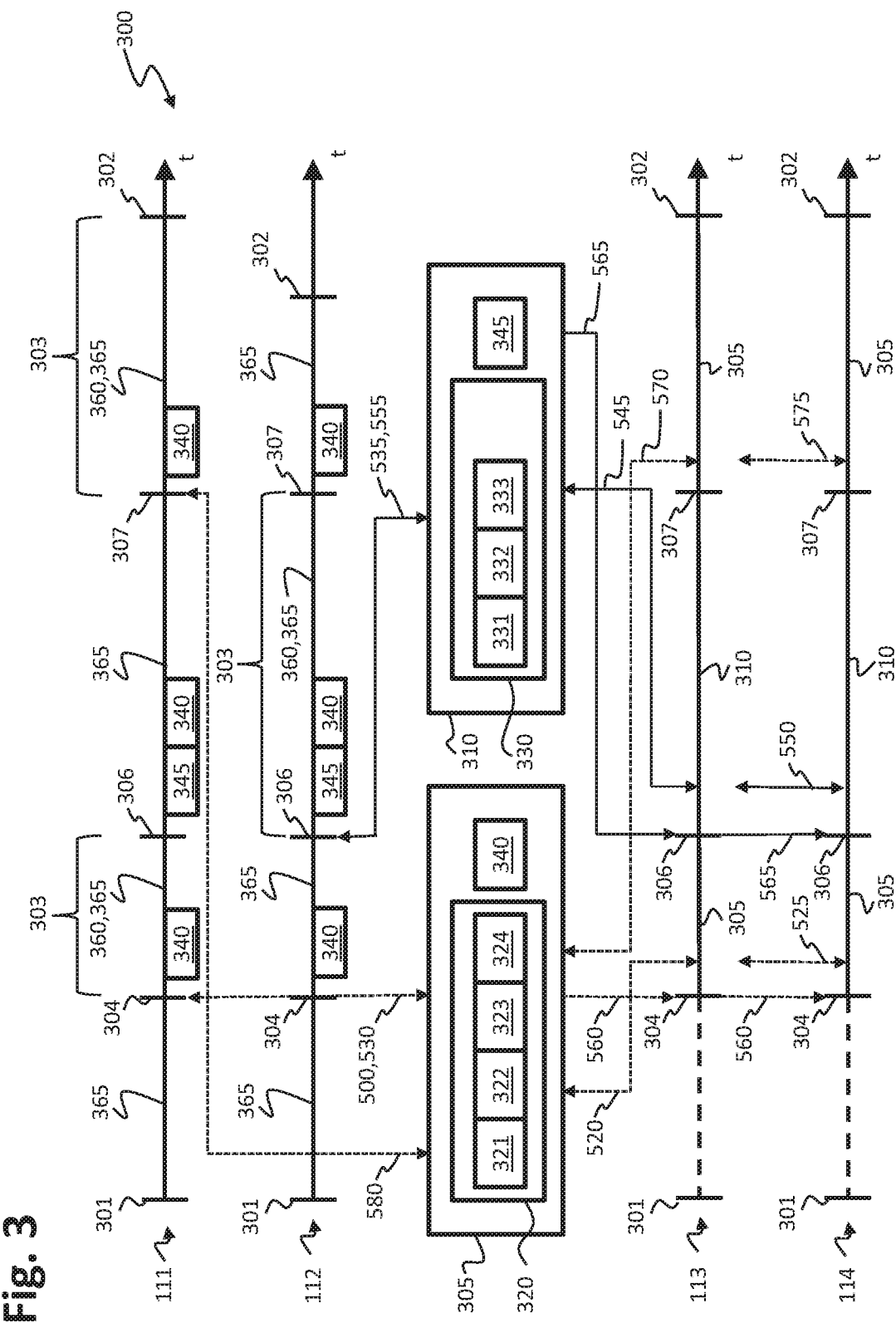
FIG. 3 depicts a timing chart of a method for processing data on the PLC of FIG. 1.

FIG. 3 shows a time diagram of a method 300 of FIG. 2. FIG. 3 illustrates real-time-data processing of the PLC 100 shown in FIG. 1 on the first and second master-processor core 111, 112 and the first and second parallel-processor core 113, 114. Real-time-data processing constitutes the main idea and is visualized across four time axes that illustrate execution of the respective programs of the control task on the first and second master-processor core 111, 112 and the first and second parallel-processor core 113, 114.

The basic idea is to determine the execution times of the programs of the first and second master-processor core 111, 112 in such a way that the first and second master-processor core 111, 112 are able to sequentially process the first to seventh partial tasks 321-324, 331-333 from the first and second work package 305, 310 without being supported by the first and/or second parallel-processor core 113, 114. In order to most effectively utilize the existing resources and to reduce total execution time of the first to seventh partial tasks 321-324, 331-333 in the respective programs of the control task, the first to seventh partial tasks 321-324, 331-333 may also be distributed to the first and/or second parallel processor core 113, 114, wherein the first and second master-processor core 111, 112 further sequentially participate in the processing of the first to seventh partial tasks 321-324, 331-333. In addition, it is possible for the most highly prioritized programs of the respective master-processor cores 111, 112 by parallelization to schedule the shorter execution times of the corresponding programs and in this way to meet a deadline that is shorter than a merely sequential execution time of the programs.

The two vertical bars at the top of the upper two time axes in FIG. 3 mark the start 301 of the respective program execution on the first master-processor core 111 and the second master-processor core 112. These bars have been plotted in the lower two time axes for the first parallel-processor core 113 and the second parallel-processor core 114 for a better comparability, as well, in order to show the start 301 of program execution. The first master-processor core 111 and the second master-processor core 112 e.g. sequentially process 365 tasks after the corresponding start 301 of program execution while the first parallel-processor core 113 and the second parallel-processor core 114 do not carry out any calculations at first (dashed horizontal line in the lower two time axes).

The second vertical bar having reference sign 304 in the uppermost time axis in FIG. 3 shows that the program of the first master-processor core 111 now reaches the parallel processing section 303. As a result, the first master-processor core 111 generates the first work package 305 comprising the first portion of partial tasks 320 as well as the reference to the first priority level 340 of the parallel processing section 303 of the first master-processor core 111. The step of generating the first work package 305 by the first master-processor core 111 is indicated by an arrow having reference numeral 500. The first master-processor core 111 may hand over the reference to the first priority level 340 of the parallel processing section 303 of the first master-processor core 111 to the first and second parallel-processor core 113, 114 via the priorities administrator 350 shown in FIG. 2. The step of handing over the reference of the first priority level 340 to the first and second parallel-processor core 113, 114 is illustrated by the arrows having reference sign 560. The priorities administrator 350 enters the reference to the first priority level 340 into the data structure in the data-structure memory according to its priority level.

The corresponding entries of the first priority level 340 of the data structure are indicated directly below the two upper time axes in FIG. 3 for the respective executions of the programs on the first master-processor core 111 and the second master-processor core 112.

The first parallel-processor core 113 and the second parallel-processor core 114 each send a request to the first work package 305 for a free first to fourth partial task 321-324, as already described above in context with FIG. 2. The request of the first and second parallel-processor core 113, 114 is shown by the two arrows having reference signs 520, 525. For example, the first parallel-processor core 113 may be assigned the first partial task 321 for processing. The first partial task 321 is then no longer available for distribution in order to be able to avoid multiple distribution. In this manner, the second parallel-processor core 114 may e.g. be assigned the second partial task 322. In the meantime, the first master-processor core 111 processes sequentially 365 and may e.g. be assigned the third partial task 323 for processing. The second master-processor core 112 may continue to sequentially process 365 tasks in time that do not require parallelization and are consequently not comprised by the first or second work package 305, 310.

The third vertical bar having reference numeral 306 of the second time axis in FIG. 3 indicates the beginning of the parallel processing section 303 of the second master-processor core 112. The continuous arrow 535 shows the second work package 310 generated by the second master-processor core 112. It contains the second portion of partial tasks 330 and contains the reference to the second priority level 345 of the parallel processing section 303 of the second master-processor core 112. As described above, the reference to the second priority level 345 may be handed over to the first parallel-processor core 113 and to the second parallel-processor core 114 via the priorities administrator 350 and saved in the data structure 355 in the data-structure memory. The step of handing over the reference to the second priority level 345 to the first and second parallel-processor core 113, 114 is e.g. illustrated by the two arrows having reference numerals 565. The second priority level 345 of the parallel processing section 303 of the second master-processor core 112 may e.g. be higher than the first priority level 340 of the parallel processing section 303 in the program of the first master-processor core 111. The priorities administrator may as a result change the order of the entries in the data structure so that the second priority level 345 may be set to first place among the entries of the priority levels and may further inform the first parallel-processor core 113 and the second parallel-processor core 114 on the changes of the order of the entries of the priority levels. The entries of the second priority level 345 and of the first priority level 340 of the data structure are shown below the upper two time axes.

The first and second partial tasks 321, 322 previously processed by the first parallel-processor core 113 and the second parallel-processor core 114 are interrupted for this reason. The intermediate results of the calculations may be handed over to the control unit 120 depicted in FIG. 1 and saved in the intermediate-result-memory unit if the interrupted first and second partial tasks 321, 322 are to be processed further with the intermediate results obtained so far. Moreover, it is possible not to save the intermediate results. This, however, requires a re-calculation of the first and second partial task 321, 322 after interruption. It is furthermore conceivable to further process the first and second partial tasks 321, 322 up to a predetermined point of interruption and then to interrupt processing. The point of interruption may e.g. be set in a control structure in the first and second partial task 321, 322 of the first work package. The point of interruption may e.g. be set at the beginning or at the end of the control-structure cycle. The advantage of this determination is that only the current iteration of the control structure that may e.g. be a loop and potentially existing intermediate results have to be saved.

The first parallel-processor core 113 and the second parallel-processor core 114 now each send a request to the second work package 310 for one of the unprocessed fifth to seventh partial tasks 331-333, as described above. The request of the first and second parallel-processor core 113, 114 is shown by the two arrows having reference numerals 545, 550. For example, the first parallel-processor core 113 is assigned the fifth partial task 331 and the second parallel-processor core 114 is assigned the seventh partial task 333. In the meantime, e.g. the first master-processor core 111 may continue to process the third partial task 323 and the second master-processor core 112 may in this manner receive the sixth partial task 332 for sequential processing 365. As soon as the first master-processor core 111 has fully processed the third partial task 323 it may e.g. start on processing the fourth partial task 324, regardless of the fact that the associated first priority level 340 is not first among the entries of priority levels in the data structure, as the order of the priority-level entries is only relevant for the two parallel-processor cores 113, 114. Alternatively, the first master-processor core 111 may also process one of the previously interrupted first or second partial tasks 321, 322 after finishing processing of the third partial task 323.

If the fifth to seventh partial task 331-333 of the second work package 310 has been fully processed at the end of the parallel processing section 303 in the program of the second master-processor core 112 by the above-mentioned processor cores 112, 113, 114, the priorities administrator removes the entry of the second priority level 345 from the data structure in the data-structure memory. At the same time, the priorities administrator resets the entry of the first priority level 340 to first place in the data structure and informs the first and second parallel-processor core 113, 114 on the change of the entries of the priority levels in the data structure. The entries of the second priority level 345 and/or the first priority level 340 of the data structure can be seen below the two upper time axes in FIG. 3, as already described above.

The fourth vertical bar having reference sign 307 of the time axis of the second master-processor core 112 in FIG. 3 e.g. shows the end of the parallel processing section 303 in the program of the second master-processor core 112, i.e. all partial tasks of the second work package have been processed and the second priority level 345 is removed from the data structure. As a result, the first priority level 340 of the first work package 305 returns to first place among the entries in the data structure; for this reason, the first and second parallel-processor core 113, 114 again access the first work package 305 and the first to fourth partial tasks 321-324 contained therein. The access of the first and second parallel-processor core 113, 114 to the first work package 305 is indicated by the two arrows having reference signs 570, 575. For example, assignment of the partial tasks to the two parallel-processor cores 113, 114 may be unchanged, as described above. This means that the first partial task 321 may be assigned to the first parallel-processor core 113, the second partial task 322 may be assigned to the second parallel-processor core 113 and the fourth partial task 324 may be assigned to the first master-processor core 111. The assignment of the fourth partial task 324 for the first master-processor core is indicated by the arrow having reference numeral 580. The third partial task 323 may in the meantime have been fully processed by the first master-processor core 111. For example, the intermediate results of the calculation when interrupting the first and second partial tasks 321, 322 may have been saved in the intermediate-result-memory unit. As the first master-processor core 111 and the first and second parallel-processor core 113, 114 access the intermediate-result-memory unit, the mentioned first and second partial tasks 321, 322 may be directly processed further starting from the point of interruption.

As soon as the second master-processor core 112 requests a further partial task in the parallel processing section 303 from its work package 310, but an unprocessed partial task is no longer available, the second master-processor core 112 waits until the parallel-processor cores 113, 114 have finished the partial tasks currently being processed. Then the parallel processing section 303 of the second master-processor core 1121 is abandoned and the second work package 310 is deleted. After this, the second master-processor core 112 carries out any desired further (non-parallelized) calculations, e.g. building on the results of the previous parallel processing section 303. The end 302 of the program of the second master-processor core 112 is indicated by the fifth vertical bar. The program of the second master-processor core 112 has then calculated its final result and has arrived at the end 302.

Program execution of the second master-processor core 112 in FIG. 3 may e.g. end 302 prior to program execution of the first master-processor core 111. The end 302 of the program execution of the second master-processor core 112 is indicated by the fifth vertical bar of the second time axis in FIG. 3. In the shown embodiment example, the parallel-processor cores 113, 114 carry out calculations up until the end 302 of the program execution of the first master-processor core 111, but only because the first master-processor core 111 comprises a parallel processing section 303 up until the end 302 of its program execution. For this reason, the end 302 of the program execution of the first master-processor core 111 was plotted in the two time axes of the two parallel-processor cores 113, 114. As the parallel-processor cores 113, 114 can only carry out parallelized calculations, i.e. partial tasks from the first and/or second work package 305, 310, the first and second parallel-processor core 113, 114 only carry out calculations as long as partial tasks are still available in the work packages 305, 310. As long as at least one of the two master-processor cores 111, 112 is still active, further new work packages comprising partial tasks may, however, be generated at a later point in time to be processed by the parallel-processor cores 113, 114. As a result, the end 302 of the program of the associated master-processor core 111, 112 may occur at a later point in time.

As soon as the first master-processor core 111 in the parallel processing section 303 requests a further partial task from its work package 305, but unprocessed ones are no longer available, the first master-processor core 111 waits until the parallel-processor cores 113, 114 have finished the partial tasks currently being processed. Then the parallel processing section 303 of the first master-processor core 111 is abandoned and the first work package 305 is deleted.

The end 302 of the program of the first master-processor core 111 is indicated by the fifth vertical bar. The program of the first master-processor core 111 has then calculated its final result and has arrived at the end 302. It is also conceivable that the first master-processor core 111, in analogy to the second master-processor core 112, may carry out any desired further (non-parallelized) calculations after the parallel processing section 303, e.g. building on the results of the previous parallel processing section 303.

In an embodiment, the first and second work package 305, 310 is generated by the first and second master-processor core 111, 112 with the first and second portion of partial tasks 320, 330 as well as the reference to the first and second priority level 340, 345 at the start 301 of the execution of the respective program. It is also conceivable that at the start of a further parallel processing section 303, a new work package is generated in the program of the first master-processor core 111 and/or of the second master-processor core 112.

Instead of interrupting the currently processed first to fourth partial task 321-324 (fifth to seventh partial task 331-333), it is furthermore conceivable to process the first to fourth partial task 321-324 (fifth to seventh partial task 331-333) up until the end and to distribute a new fifth to seventh partial task 331-3-33 (first to fourth partial task 321-324) with a higher priority level of the respective parallel processing section 303 suitable for the first and second parallel-processor core 113, 114 and the second master-processor core 112 (first master-processor core 111). In this manner, the parallel-processor cores 113, 114 are not forced to immediately stop or interrupt their calculations if the new fifth to seventh partial task 331-333 (first to fourth partial task 321-324) are assigned a higher priority than the current first to fourth partial task 321-324 (fifth to seventh partial task 331-333). This embodiment may e.g. be used if the first to seventh partial tasks 321-324, 331-333 in the first work package 305 and the second work package 310 are relatively small and processing by the processor cores may accordingly be carried out speedily. The advantage of this embodiment is that the calculation throughput is highest without any stops or interruption of the first to seventh partial task 321-324, 331-333 on the two parallel-processor cores 113, 114.

The immediate stop of the currently processed first to seventh partial tasks 321-324, 331-333 on the two parallel-processor cores 113, 114 without saving the data may e.g. be used if the first or second master-processor core 111, 112 have a parallel processing section 303 with a very small cycle time and parallelization is required in order to be able to keep the deadlines. The advantage is that by this embodiment, a lowest possible latency may be achieved, wherein the latency indicates the time between breaking off the calculation of the current first to fourth partial tasks 321-324 (fifth to seventh partial task 331-333) on the parallel-processor cores 113, 114 and the start of the calculations of the new fifth to seventh partial task 331-333 (first to fourth partial task 321-324) on the parallel-processor cores 113, 114 which is linked to a higher priority level. Such an embodiment aims for achieving a lowest possible latency; for this reason, intermediate results of the first to seventh partial task 321-324, 331-333 having a low priority level may be dismissed.

The embodiment in which the currently processed first to seventh partial tasks 321-324, 331-333 are interrupted and their intermediate results saved in the intermediate-result-memory unit may represent a good compromise between latency and throughput. It is possible to combine the various above-described embodiments of the interruption, the immediate stopping or the suitable sorting of the first to seventh partial task with each other or to realize them in a suitable manner depending on the situation.

Moreover, the first to seventh partial tasks 321-324, 331-333 from the first and second work package 305, 310 may be distributed at the beginning of the respective parallel processing section 303 in the program of the first and second master-processor core 111, 112. Furthermore, the mentioned first to seventh partial tasks 321-324, 331-333 may be statically distributed to the first and second master-processor core 111, 112 and the first and second parallel-processor core 113, 114. By statically distributing the first to seventh partial tasks 321-324, 331-333 from the first work package 305 and the second work package 310, the time and effort involved in administration may be reduced as the request of the first and second parallel-processor core 113, 114 for a free first to seventh partial task 321-324, 331-333 becomes obsolete. In addition, the first master-processor core 111 and/or the second master-processor core 112 may, after finishing processing of their own partial tasks, examine whether free first to seventh partial tasks 321-324, 331-333 in the first and/or second work package 305, 310 remain. Said still free first to seventh partial tasks 321-324, 331-333 may be processed by the first master-processor core 111 and/or the second master-processor core 112 itself so that the deadlines of the respective programs may be met.

If more than the two master-processor cores 111, 112 shown in FIGS. 1 to 3 are used, the number of work packages and the number of partial tasks may differ from the number shown in FIGS. 2 and 3 and described in conjunction therewith. In such a case, the number of work packages and the number of partial tasks may increase as more computing capacity may be made available. The computing capacity may be utilized in the best possible manner with more work packages and more partial tasks. For the embodiments in FIGS. 2 and 3, a first work package 305 and a second work package 310 as well as four first to fourth partial tasks 321-324 of the first work package 305 and three fifth to seventh partial tasks 331-333 of the second work package 310 have been assumed. In other embodiments, the number of work packages and the number of partial tasks may differ from the embodiment shown and described in FIGS. 2 and 3, even if the number of master-processor cores remains unchanged.

Figure 4:
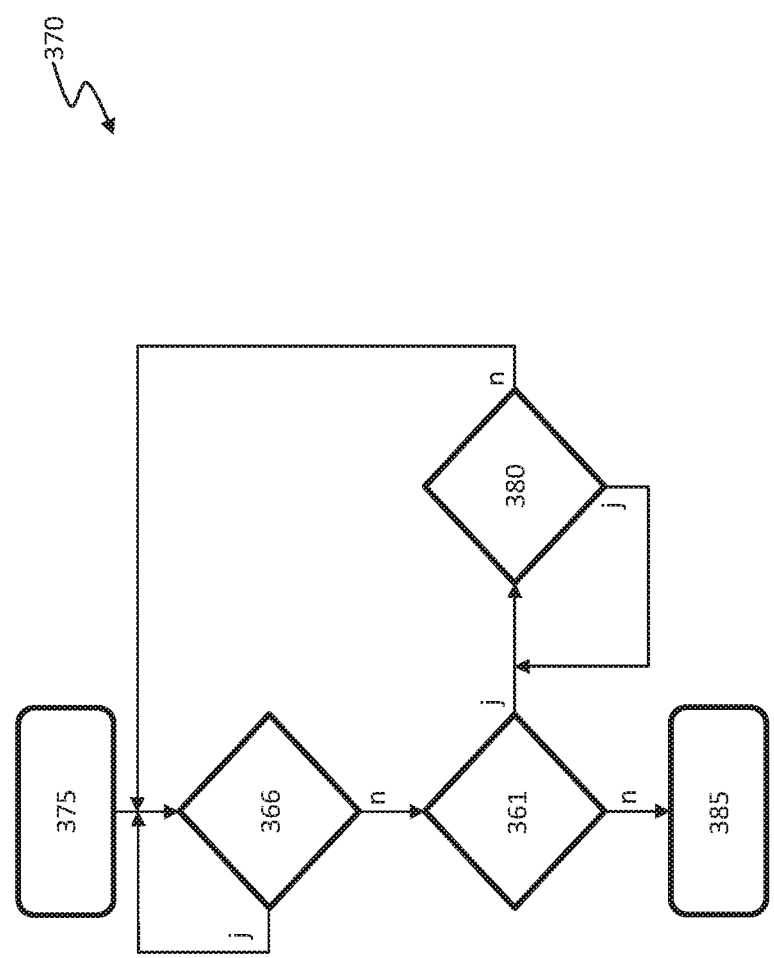
FIG. 4 shows a program-flow chart for a master-processor core in the PLC depicted in FIG. 1.

FIG. 4 shows a program-flow chart 370 for the first and the second master-processor core 111, 112 according to the embodiments of FIGS. 1 to 3. In the first step 375, execution of the respective program on the first and second master-processor core 111, 112 of FIGS. 2 and 3 is started. FIG. 4 then shows a junction at which in a second step 366 an examination takes place whether sequential execution 365 of the respective program according to FIG. 3 is to be carried out. If this is the case, tasks that do not require parallelization are sequentially processed 365 by the first and/or second master-processor core 111, 112 according to FIGS. 2 and 3. If sequential processing 365 of the partial tasks is not to be carried out in the program, at a second junction in a third step 361 in FIG. 4 an examination takes place whether a parallel execution 360 of the partial task is possible according to FIG. 3. If this is the case, the partial tasks may be processed according to FIGS. 2 and 3 by the first and second master-processor core 111, 112 and the first and second parallel-processor core 113, 114. For this purpose, at the beginning of the parallel processing section 303, the first and second master-processor core 111, 112 generate the first and second work package 305, 310 comprising the first and second portion of partial tasks 320, 330 as well as the reference to the first and second priority level 340, 345 of the parallel processing section 303 according to FIG. 3, as described above. Additionally, the reference to the first and second priority level 340, 345 is handed over to the priorities administrator 350 shown in FIG. 2 that enters it into the data structure 355 in the data-structure memory. The reference to the first and second priority level 340, 345 is furthermore forwarded to the first and second parallel-processor core 113, 114 by the priorities administrator 350.

At a third junction, an examination is carried out in a fourth program step 380 whether first to seventh partial tasks 321-324, 331-333 according to FIGS. 2 and 3 are present in the corresponding first and second work package 305, 310. This is carried out by the first and second master-processor core 111, 112 as well as the first and second parallel-processor core 113, 114 making a request to the first and second work package 305, 310, provided that the first and second master-processor cores 111, 112 or, respectively, the first and second parallel-processor cores 113, 114 are not currently carrying out any calculations. After assignment of the first to seventh partial tasks 321-324, 331-333 to the first and second master-processor core 111, 112 as well as to the first and second parallel-processor core 113, 114 has been carried out, the first and second parallel-processor core 113, 114 continue to execute the corresponding first to seventh partial tasks 321-324, 331-333 until they are finished or, respectively, the first and second parallel-processor cores 113, 114 are informed by the priorities administrator 350 that the order of the entries of the priority levels in the data structure 355 has changed. As soon as the order of entries of the first and second priority level 340, 345 in the data structure 355 changes, the processed first to seventh partial tasks 321-324, 331-333 on the two parallel-processor cores 113, 114 are interrupted and calculation of the first to seventh partial task 331-333, 321-324 of the other, first or second work package 305, 310 is started.

The first to seventh partial tasks 321-324, 331-333 according to FIGS. 2 and 3 may be interrupted immediately or be processed further up until a predetermined interruption point and interrupted then, as described above. The intermediate results may be saved on the intermediate-result-memory unit which renders resuming calculations of the first to seventh partial tasks 321-324, 331-333 starting from the interruption point fast and easy. After a first to seventh partial task 321-324, 331-333 has been fully processed by the first or second parallel-processor core 113, 114 or by the first or second master-processor core 111, 112, the first and/or second master-processor cores 111, 112 or, respectively, the first and/or second parallel-processor cores 113, 114 again send a request to the first and second work package 305, 310 whether further unprocessed or, respectively, free first to seventh partial tasks 321-324, 331-333 exist. This fourth step 380 of FIG. 4 is repeated until free first to seventh partial tasks 321-324, 331-333 no longer exist in the associated first and second work package 305, 310.

The two master-processor cores 111, 112 have to wait until the parallel-processor cores 113, 114 have finished the current first to seventh partial tasks 321-324, 331-333 associated with the respective master-processor core 111, 112, as it is possible that the master-processor cores 111, 112 are not assigned any free first to seventh partial tasks 321-324, 331-333, the parallel-processor cores 113, 114, however, are busy with processing the first to seventh partial task 321-324, 331-333. As a result, sequential processing 365 cannot be continued until all associated first to seventh partial tasks 321-324, 331-333 have been fully processed.

As a result, the second step 366 of FIG. 4 examines whether sequential execution 365 is provided in the respective program of the first and/or second master-processor core 111, 112. The further examining steps of the junctions of FIG. 4 are continued as described above. If the examination of FIG. 4 with regard to the processing mode of first to seventh partial tasks 321-324, 331-331 neither provides sequential execution 365 nor parallel execution 360 of the calculations, program execution is finished on the first master-processor core 111 and/or the second master-processor core 112 in the fifth step of FIG. 4.

Figure 5:
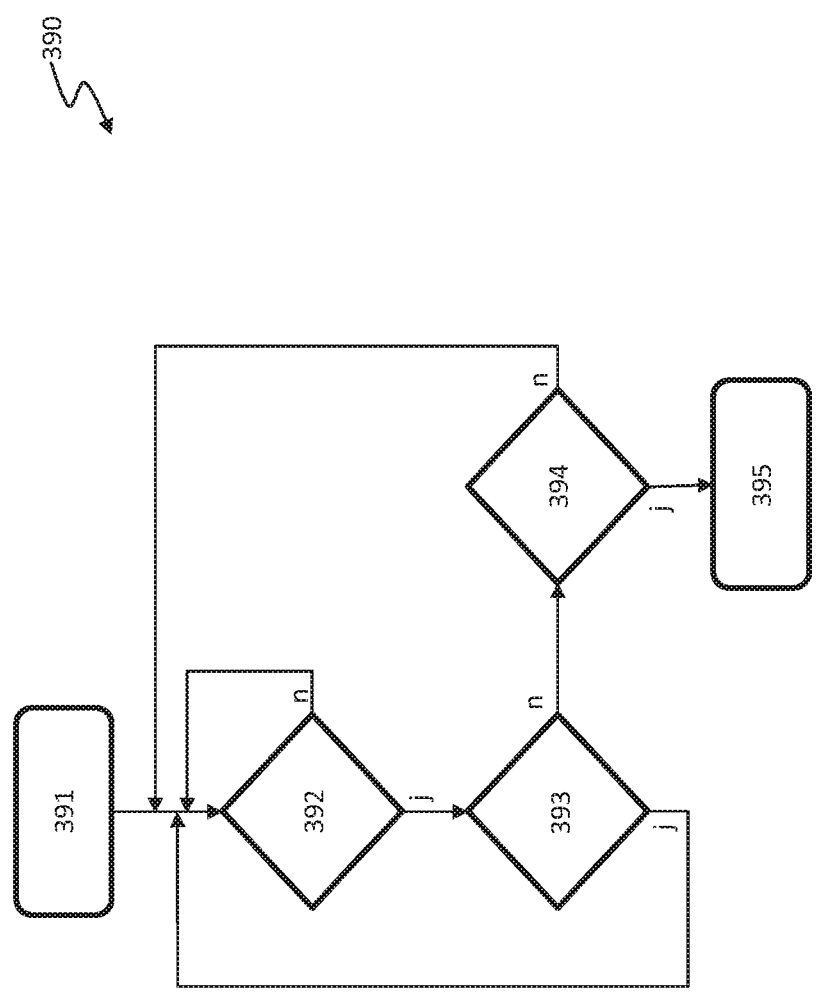
FIG. 5 depicts a program-flow chart of a parallel-processor core in the PLC depicted in FIG. 1.

FIG. 5 shows the program-flow chart 390 for the first and second parallel-processor core 113, 114 according to the embodiments of FIGS. 1 to 4. In a first step 391, execution of the respective program is started. This is followed by a junction in which the second step 392 examines whether in the data structure 355 shown in FIG. 2 an entry on the first or second priority level 340, 345 can be found. If this is the case, the first and second parallel-processor core 113, 114 of FIGS. 2 and 3 in a third step 393 send a request to the corresponding first and second work package 305, 305 whether free first to seventh partial tasks 321-324, 331-333 are available for processing. This third step 393 for examining is indicated by the second junction in FIG. 5. If free first to seventh partial tasks 321-324, 331-333 are available, these are processed by the first and second parallel-processor core 113, 114. Here, too, an interruption and saving of the first to seventh partial tasks 321-324, 331-333 or, respectively, continued calculation of the first to seventh partial tasks 321-324, 331-333 until a predetermined interruption point and saving of the intermediate results may occur, as has been described in context with FIGS. 2 and 3. After a first to seventh partial task 321-324, 331-333 has been fully processed by the first or seventh parallel-processor core 113, 114, the corresponding program of the first and second parallel-processor core 113, 114 jumps back to the first junction, i.e. to the second step 392 of FIG. 5, examining whether a first or second entry of the priority level 340, 345 in the data structure 355 exist. If there is currently no entry of the priority level 340, 345 to be found in the data structure 355, the entries in the data structure 355 are examined again after a short waiting period in accordance with the second step 392.

If examining at the second junction in third step 393 of FIG. 5 leads to the result that no free first to seventh partial task 321-324, 331-333 is currently available in the corresponding first and/or second work package 305, 310, a fourth step 394 examines at the third junction of FIG. 5 whether the programs of the first and second master processor 111, 112 have been completely finished according to the description according to FIG. 4. Only in case that the execution of the programs of the first and second master-processor core 111, 112 are already finished, the program of the first and second parallel-processor core 113, 114 ends in the fifth step 395 in FIG. 5, as well. If, however, the programs of the first and second parallel-processor core 113, 114 are not finished, the program of the first and second parallel-processor core 113, 114 jumps back to the second step 392, as shown in FIG. 5.

The present invention was described in detail by preferred embodiment examples. However, it is not limited by the disclosed examples since a person skilled in the art may derive variations therefrom without exceeding the protective scope of the invention.

The advantageous embodiments and further embodiments of the present invention that have been described above and/or defined in the dependent claims may be put to use individually or in any desired combination with one another—except for in case of unambiguous dependencies and incompatible alternatives.

What is claimed is:

1. A method for executing a control task on a programmable logic controller for the control of a machine or a facility of an automation system in a program cycle, the programmable logic controller comprising at least two master-processor cores, at least one parallel-processor core and a priorities administrator, wherein the control task comprises at least two executable programs, wherein the master-processor cores are each assigned an executable program of the at least two executable programs of the control task, the at least two executable programs being executed by an associated main processor core as part of the program cycle, wherein the at least two executable programs each comprises at least one parallel processing section within the respective executable program, wherein the parallel processing sections each comprises a plurality of partial tasks, wherein the plurality of partial tasks of each parallel processing section are each executable in parallel, wherein the parallel processing sections of the at least two executable programs are each assigned a priority with a predetermined priority level, wherein the priority with the predetermined priority level is inserted into a data structure by the priorities administrator as soon as the respective master-processor core, after start of the respective executable program with sequentially processing, has arrived at the parallel processing section of the respective executable program, wherein entries of the priorities of the parallel processing sections into the data structure are made in an order of the predetermined priority levels;

wherein the at least one parallel-processor core examines whether entries are present in the data structure by an active request of the at least one parallel-processor core for entries in the data structure and, if said entries are present, the at least one parallel processor core accesses the partial tasks of the parallel processing section, the priority level of which ranks first among the entries in the data structure, wherein the parallel processor core interrupts an execution of partial tasks of a first parallel processing section when a second parallel processing section with a higher priority level is indicated by the priorities administrator, wherein the plurality of master-processor cores processes partial tasks of the at least one parallel processing section of the respective executable program that are not processed by the at least one parallel-processor core in the program cycle, and wherein the executable program having the priority with a highest priority level for the parallel processing sections schedules an execution time that is shorter than a purely sequential execution time of the executable program, and the executable program having the priority with a lowest priority level of the parallel processing sections schedules an execution time that is a purely sequential execution time of the executable program.

2. The method of claim 1, wherein the partial tasks of the at least one parallel processing section of the executable program are distributed dynamically, wherein the master-processor cores and the at least one parallel-processor core access unprocessed partial tasks for processing, and wherein the partial tasks that were distributed to the at least one parallel-processor core for processing are also executable on the respective master-processor core.

3. The method of claim 1,
wherein an access to the partial task of the at least one parallel processing section of the executable program only exists for the master-processor core currently processing the respective executable program or for the at least one parallel-processor core, and
wherein the partial tasks of the at least one parallel processing section of the executable program are distributed to the respective master-processor core and the at least one parallel-processor core individually and one after the other.

4. The method of claim 1,
wherein the partial tasks for the at least one parallel processing section of the executable program are distributed statically, and
wherein the respective master-processor core and the at least one parallel-processor core are for this purpose each associated with a specific number of partial tasks of the at least one parallel processing section of the executable program for processing.

5. The method of claim 1, wherein modifications in an order of the entries in the ordered data structure are communicated to the at least one parallel-processor core.

6. The method of claim 1, wherein calculations of current partial tasks in the parallel processing section on the at least one parallel-processor core are interrupted if a new entry of the priority level takes first place in the data structure.

7. The method of claim 6, wherein the current partial tasks are processed further by the at least one parallel-processor core until a predetermined point of interruption, and are then interrupted.

8. The method of claim 7, wherein the predetermined point of interruption is determined in a control structure in the partial tasks of the at least one parallel processing section of the executable program.

9. The method of claim 6, wherein an intermediate result of the calculations of the current partial tasks of the at least one parallel processing section of the executable program is saved.

10. A programmable logic controller (PLC) for the control of a machine or a facility of an automation system, the programmable logic core executing a control task in a program cycle, comprising:
a communications interface for reading in sensor data and for outputting actuator data,
a data-processing unit comprising at least two master-processor cores, and at least one parallel-processor core for carrying out the control task in order to generate actuator data from the sensor data,
a control unit comprising a memory for storing a data structure comprising priority levels and a priorities administrator for administrating the priority levels in the data structure,
wherein the control task comprises at least two executable programs, wherein the master-processor cores are each assigned an executable program of the at least two executable programs of the control task, the at least two executable programs being executed by an associated main processor core as part of the program cycle,
wherein the at least two executable programs each comprises at least one parallel processing section, wherein the parallel processing sections each comprises a plurality of partial tasks,
wherein the plurality of partial tasks of each parallel processing section are each executable in parallel,
wherein the parallel processing sections of the at least two executable programs are each assigned a priority with a predetermined priority level,
wherein the priorities administrator is configured to insert the priority with the predetermined priority level into the data structure as soon as the respective master-processor core, after start of the respective executable program with sequentially processing, has reached the at least one parallel processing section in the respective executable program,
wherein entries of the priorities of the parallel processing sections into the data structure are made in an order of the predetermined priority levels;
wherein the at least one parallel-processor core is configured to examine whether entries are present in the data structure by an active request of the at least one parallel-processor core for entries in the data structure, and, if said entries are present, the at least one parallel processor core accesses the partial tasks of the parallel processing section, the priority level of which ranks first among the entries in the ordered data structure,
wherein the parallel processor core is configured to interrupt an execution of partial tasks of a first parallel processing section when a second parallel processing section with a higher priority level is indicated by the priorities administrator,
wherein the plurality of master-processor cores is configured to process partial tasks of the at least one parallel processing section of the respective executable program that are not processed by the at least one parallel-processor core in the program cycle, and
wherein the executable program having the priority with a highest priority level for the parallel processing sections schedules an execution time that is shorter than a purely sequential execution time of the executable program, and the executable program having the priority with a lowest priority level of the parallel processing sections schedules an execution time that is a purely sequential execution time of the executable program.

11. The programmable logic controller of claim 10, wherein the control unit is executed on a plurality of master-processor cores in a distributed manner.

12. The programmable logic controller of claim 10, wherein the priorities administrator is configured to inform the at least one parallel-processor core on a change of the entries in the data structure in order to interrupt a current calculation of a partial task.

13. The programmable logic controller of claim 10,
wherein the at least one parallel-processor core is configured to interrupt a calculation of a current partial task, if a new entry is set to first place among the entries in the data structure, and to hand over an intermediate result of the calculation to the control unit, and
wherein the control unit is configured to save the intermediate result of the calculation of the current partial task on a memory unit which is accessed by the plurality of master-processor cores and the at least one parallel-processor core.

14. The programmable logic controller of claim 13, wherein a current partial task for which calculations are interrupted is calculated on the respective master-processor core starting from an interruption point, while the at least one parallel-processor core starts to process a new partial task.

15. The programmable logic controller of claim 10, wherein the priorities administrator is configured to remove the entry from the data structure, if the partial tasks of the at least one parallel processing section of the executable program are fully processed.

16. An automation system, comprising:
a programmable logic controller (PLC) for the control of a machine or a facility of an automation system, the programmable logic controller executing a control task in a program cycle, comprising:
   a communications interface for reading in sensor data and for outputting actuator data, a data-processing unit comprising at least two master-processor cores, and at least one parallel-processor core for carrying out the control task in order to generate actuator data from the sensor data, and
   a control unit comprising a memory for storing a data structure comprising priority levels and a priorities administrator for administrating the priority levels in the data structure; and
a machine, comprising actuators and sensors;
wherein the actuators and sensors of the machine are connected to the programmable logic controller via the communications interface,
wherein the master-processor cores are each assigned an executable program of the at least two executable programs of the control task, the at least two executable programs being executed by an associated main processor core as part of the program cycle,
wherein the at least two executable programs each comprises at least one parallel processing section, wherein the parallel processing sections each comprises a plurality of partial tasks,
wherein the plurality of partial tasks of each parallel processing section are each executable in parallel,
wherein the parallel processing sections of the at least two executable programs are each assigned a priority with a predetermined priority level, and
wherein the priorities administrator is configured to insert the priority with the predetermined priority level into the data structure as soon as the respective master-processor core, after start of the respective executable program with sequentially processing, has reached the at least one parallel processing section in the respective program,
wherein entries of the priorities of the parallel processing sections into the data structure are made in an order of the predetermined priority levels,
wherein the at least one parallel-processor core is configured to examine whether entries are present in the data structure by an active request of the at least one parallel-processor core for entries in the data structure, and, if said entries are present, the at least one parallel processor core accesses the partial tasks of the parallel processing section, the priority level of which ranks first among the entries in the ordered data structure,
wherein the parallel processor core is configured to interrupt an execution of partial tasks of a first parallel processing section when a second parallel processing section with a higher priority level is indicated by the priorities administrator,
wherein the plurality of master-processor cores is configured to process partial tasks of the at least one parallel processing section of the respective executable program that are not processed by the at least one parallel-processor core in the program cycle, and
wherein the executable program having the priority with a highest priority level for the parallel processing sections schedules an execution time that is shorter than a purely sequential execution time of the executable program, and the executable program having the priority with a lowest priority level of the parallel processing sections schedules an execution time that is a purely sequential execution time of the executable program.

17. The automation system of claim 16, wherein the control unit is executed on a plurality of master-processor cores in a distributed manner.

18. The automation system of claim 16, wherein the priorities administrator is configured to inform the at least one parallel-processor core on a change of the entries in the data structure in order to interrupt a current calculation of a partial task.

19. The automation system of claim 16,
wherein the at least one parallel-processor core is configured to interrupt a calculation of a current partial task, if a new entry is set to first place among the entries in the data structure, and to hand over an intermediate result of the calculation to the control unit, and
wherein the control unit is configured to save the intermediate result of the calculation of the current partial task on a memory unit which is accessed by the plurality of master-processor cores and the at least one parallel-processor core.

20. The automation system of claim 16, wherein the at least one parallel processing section of the executable program is fully processed.

* * * * *